United States Patent [19]

Ear

[11] 4,036,994
[45] July 19, 1977

[54] METHOD FOR ABATING ODOR AND SMOKE EMISSIONS IN THE VAPOR EXHAUST FROM A MEAT BROILING GRILL

[75] Inventor: Frank P. Ear, Nashville, N.C.

[73] Assignee: H.G.C. Construction & Equipment Company, Inc., Rocky Mount, N.C.

[21] Appl. No.: 560,593

[22] Filed: Mar. 21, 1975

[51] Int. Cl.² .......................... A23L 1/31; A47J 37/06
[52] U.S. Cl. ...................................... 426/233; 426/523
[58] Field of Search ................ 426/233, 523; 423/224, 423/245; 98/115 K; 55/DIG. 36; 21/53; 23/288 F, 284, 285

[56] References Cited

U.S. PATENT DOCUMENTS

| | | | |
|---|---|---|---|
| 2,683,074 | 7/1954 | Kuehner | 21/53 |
| 3,381,679 | 5/1968 | Gonzalez | 98/115 K |
| 3,785,778 | 1/1974 | Burstein | 423/210 |
| 3,837,269 | 9/1974 | Sweet | 98/115 K |

FOREIGN PATENT DOCUMENTS 1,152,705   5/1969   United Kingdom ................ 423/224

*Primary Examiner*—Norman Yudkoff
*Assistant Examiner*—Martin G. Mullen
*Attorney, Agent, or Firm*—Cushman, Darby & Cushman

[57] ABSTRACT

For abating odor and smoke emissions from e.g., a fast food restaurant broiling grill, the grilling is conducted using (a) higher temperature radiating surfaces such as thinner ceramic briquettes in order to incinerate more potential emissions at the source, (b) an oxidizer/water scrubber in the exhaust gas stream, and/or (c) blower means for mixing the exhaust gas stream with ambient air prior to discharge of the exhaust gas stream. The preferred oxidizer is hydrogen peroxide. The temperature of the radiating surfaces facing the food being cooked is preferably between 600° and 800° F. And the material bearing the radiating surfaces is preferably about one-half inch thick. The oxidizer may be operated in response to signalling from an automated smoke or odor detection device. The exhaust gas/ambient air mixing device is most useful when the grain loading of the exhaust gas stream is less than 0.03 (GR./DSCF).

7 Claims, 3 Drawing Figures

METHOD FOR ABATING ODOR AND SMOKE EMISSIONS IN THE VAPOR EXHAUST FROM A MEAT BROILING GRILL

BACKGROUND OF THE INVENTION

The Clean Air Amendments of 1970 broadened the scope of the public environmental concern on ambient air quality standards to deal with problems far beyond the health needs of humans and wildlife, adding such concerns as economic values, personal comfort, well being. It increased authority of regulatory control bodies and provides for citizen suits for prodding enforcement of the Act.

The discharge to atmosphere of smoke and odor emissions from small commercial establishments including fast food restaurants and other family-type restaurants which have meat-cooking grills, is considered objectionable by air pollution regulatory agencies. The impact from these sources on air pollution may be small for each individual source, but is considered large for the entire source category.

Most of the individual states have passed laws which have established state regulatory agencies with powers to set and enforce regulations relating to air quality. The standards which have been set by the states are varied. For example, the state air quality regulations consist of three major parts:

1. Maximum Grain Loading (GR/DSCF).
2. Visible Emissions.
3. Odors

Most states allow emissions up to 0.04 GR/DSCF; some not over 0.03 GR/DSCF.

Typically, visible emissions are permitted up to 40% opacity on existing sources, but may not exceed 20% opacity on new sources. The State of Maryland allows "no visible emissions".

Odor emission regulations have been adopted by thirty-seven state air quality bureaus. In general terms, a typical state odor emission regulation states that no person shall cause . . . odor emissions . . . beyond property line . . . unless . . . all gases are incinerated to (1200° F.) (1600° F.) for at least (0.5) (0.3) seconds. None of the state regulations are specific to the fast food or family-type restaurant. Similar to other small establishments, they are considered as a fixed source of air pollution regardless of their size.

On a county and/or local level, in absence of specific regulations, smoke and odor emission control is handled on a public nuisance basis.

The best available technology applied to these small sources has included that of incineration using afterburners which are too expensive in terms of energy usage and its costs, where available. Electrostatic precipitators have been found efficient in reducing smoke, but are not dependable due to the grease in the air stream which adds maintenance cost. In addition to the high initial costs of the units, they do not abate odors.

For instance, using an afterburner unit to eliminate odor and visible emissions from a 3500 CFM air stream (average exhaust from a family-type restaurant) requires 3,000,000 BTU/HR supplied to an oxidizing chamber at 1200° F. Using natural gas at $0.15 per therm, the cost for each hour of operation of such an afterburner unit is $4.50. Using L.P.G., where and if available, at $0.35/gallon (North East Coastal Areas), the cost is $11.00 per hour of operation. The costs of maintaining the cleanliness of the collector plates to retain their efficiency when applied in a grease-laden air stream is estimated at $300.00 per month.

In order to determine how best to reduce or eliminate objectionable airborne emissions, the present inventor has conducted a series of tests, monitored by an Environmental Protection Agency representative from the Emission Measuring Branch, Research Triangle Park, N.C., of a typical, conventional fast food restaurant char-boiler, without emission-reduction equipment in order to provide a base line against which reductions can be measured and in order to permit a determination to be made of the make-up of the gases exhausted by such a facility. The conditions and particulars of the test and a tabulation of the stack analysis are incorporated in Emission Report dated Mar. 18, 1974, and November 7, 1975, conducted by Commonwealth Laboratory, Inc., Richmond, Va., and are summarized herein.

Unlike emissions from heavy process manufacturing facilities which are steady and continuous for each hour of operation, the visible and odor emissions from small establishments including fast food or family-type restaurants are intermittent. They are characteristically heavy and are only difficult to operate in compliance with air quality regulations during the lunch and supper periods.

In the course of studying this development, the present inventor has become aware of the following prior art relating injection of an oxidizer of other fluid into a fluid stream for oxidizing or otherwise treating a portion of the contents thereof:

| Patentee | U.S. Pat. No. | Date of Issue |
|---|---|---|
| Woodward | 2,745,714 | May 15, 1956 |
| Urban | 2,956,856 | October 18, 1960 |
| Barton et al. | 3,054,653 | September 18, 1962 |
| Gonzalez | 3,381,679 | May 7, 1968 |
| Wright | 3,786,739 | January 22, 1974 |

The Woodward patent suggests the use of a shower of chlorine-containing water for deodorizing offensive organic odors in the gases generated in a fat-rendering process. Gonzalez relates to scrubbing of a gas stream from a cooking source and suggests the use of venturi for aspirating a treating liquid into the gas stream for mixed passage through the ductwork of a hood over the cooking area.

The U.S. Pat. to Newcomer, No. 3,762,394, issued Oct. 2, 1973 discloses an afterburner as an alternative to chemically oxidizing odiferous gases.

However, none of these references addresses the specific problem of small establishments, including fast food and family-type restaurant char-boiling grill exhaust streams, containing objectionable odor and visible emissions, and specifically, the reduction of the impact of these exhaust streams or air quality on an economical basis.

SUMMARY OF THE INVENTION

For abating odor and smoke emissions from e.g., a fast food restaurant broiling grill, the grilling is conducted using (a) higher temperature radiating surfaces such as thinner ceramic briquettes in order to incinerate more potential emissions at the source, (b) an oxidizer/water scrubber in the exhaust gas stream, and/or (c) blower means for mixing the exhaust gas stream with ambient air prior to discharge of the exhaust gas stream. The preferred oxidizer is hydrogen perioxide. The temperature of the radiating surfaces facing the food being cooked is preferably between 600° and 800° F. And the material bearing the radiating surfaces is preferably about one-half inch thick. The oxidizer may be operated in response to signalling from an automated smoke or odor detection device. The exhaust/ambient air mixing device is most useful when the grain loading of the exhaust gas stream is less than 0.03 (GR/DSCF).

The principles of the invention will be further discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

IN THE DRAWINGS

Figure 1:
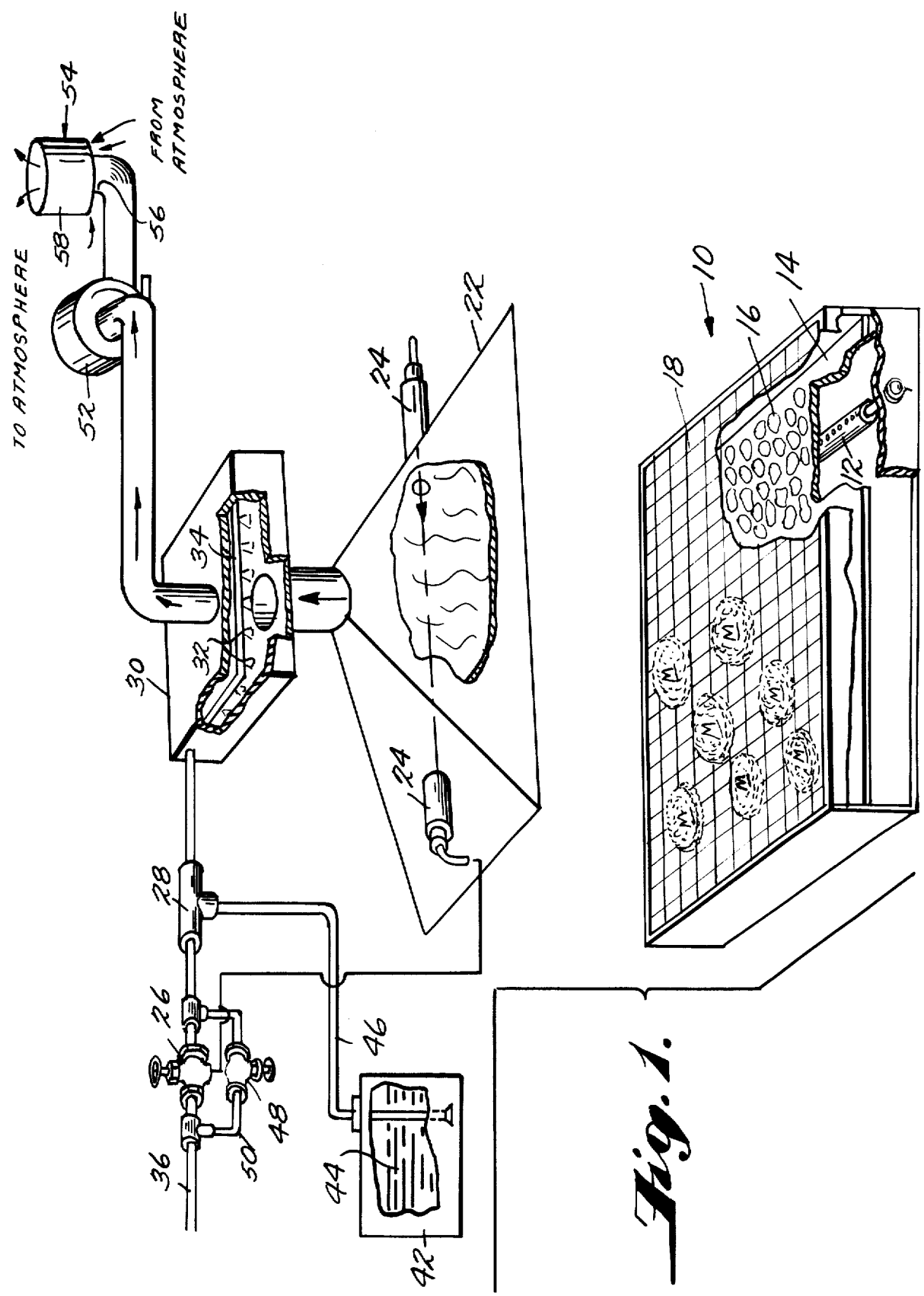

FIG. 1 is a schematic layout of a fast food or family-type restaurant grilling system provided with an odor and smoke abatement system in accordance with the principles of the present invention.

Figure 2:
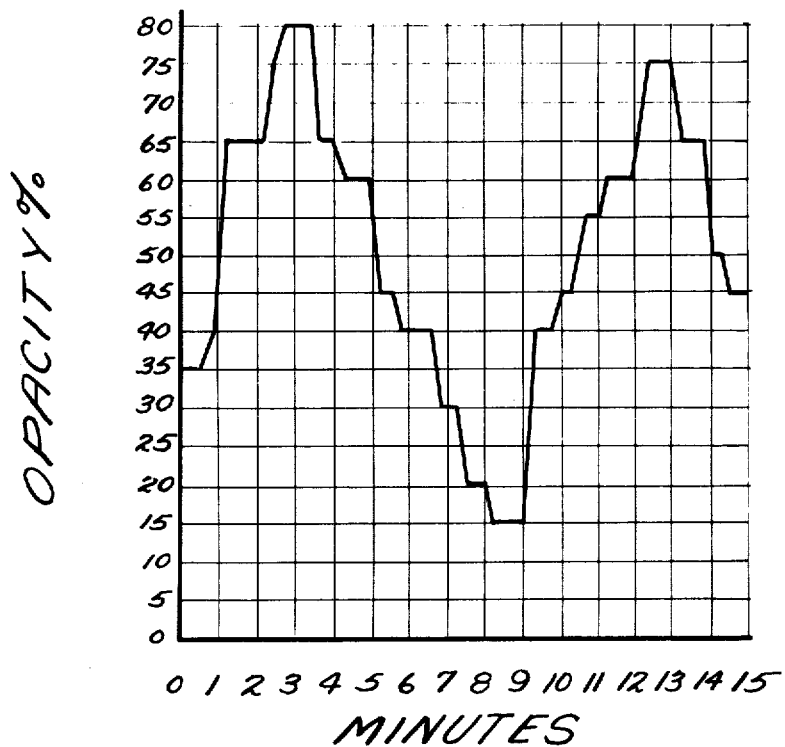

FIG. 2 is a plot of emitted smoke opacity versus time for operation of a fast food restaurant grill at full capacity without an odor and smoke abatement system.

Figure 3:
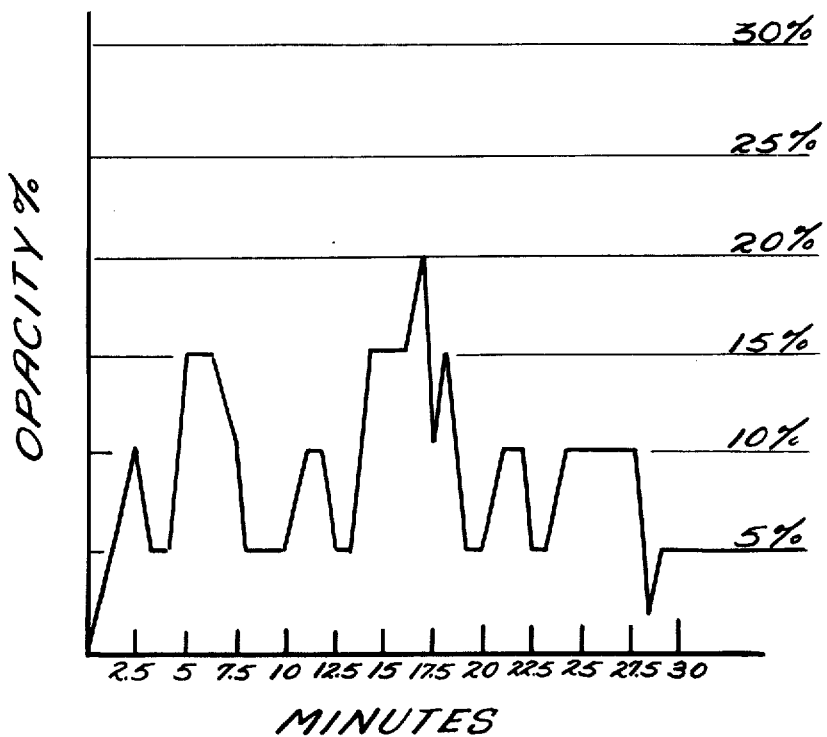

FIG. 3 is a plot of emitted smoke opacity versus time for operation of a comparable fast food restaurant grill at full capacity with the odor and smoke abatement system of the invention in operation.

DETAILED DESCRIPTION

The cooking equipment may consist of a char-broiling grill and is shown in FIG. 1 as assembly 10. It includes gas burners 12 using natural gas or propane as fuel. Above the burners 12, cast iron grates 14 may be provided to support horizontally an array of non-consumable, e.g., ceramic briquettes 16. At the cooking surface above the briquettes, support bars 18 are provided upon which the meat slabs M to be grilled, such as steaks, hamburgers, meat patties, and the like are placed. In normal practice, the meat slabs M are first cooked for a brief period on one side and then flipped over for further cooking on their opposite side. While the meat is cooking, a certain amount of fat and other meat juices drips from the meat, through the support bars 18 and onto the briquettes 16.

Ideally, the heat of the char-boiling seals the surface of the meat slab fairly quickly in order to seal in the juices as these contribute to the size, weight, succulence, food value and taste of the meat. However, as the meat slabs are turned after they have been grilled on one side, juices that have risen to the formerly upper, unsealed surface and spilled onto the briquettes. This is the point at which most smoke and odor is generated in a conventional fast food meat grilling operation.

The briquettes used for gas-fired char-boiling grills are typically made of ceramic refractory material. There is nothing new about the chemical or physical composition of the briquettes 16, provided in accordance with the present invention. Those that are used commercially in food establishments are of approximately 1¼ inches cube or approximately 1½ inches diamond configuration, and are placed close to each other on cast iron gates directly above the gas burner to diffuse the heat and radiate it to the meat above them.

The present inventor has found that the ceramic briquettes presently used in food restaurant meat grills are too thick. While they perform satisfactorily in distributing the heat so that the meat slabs are more evenly cooked, the resistance they present to the conduction of heat is so great that their upper surfaces are too cool to fully incinerate meat grease. Accordingly, the present invention proposes the reduction of the mass of the briquette material to be heated, preferably by reducing the thickness of the briquettes, whether of ceramic material or cast iron, to about ⅛ to ¼ inch thick and vented sufficiently to raise the temperature of the food-facing radiating surfaces 20 to within the range 600° F. to 800° F., and preferably nearer 800° F., which is the flash-point of beef grease. Due to the mass reduction and higher temperature of the heat radiating surface, the gas consumption will be substantially lower than the required for the conventional thick material.

Above the cooking equipment or grill assembly 10 a canopy exhaust hood 22 captures the emissions from the cooking surface. This exhaust hood incorporates smoke density opacity sensors 24 that emit a light beam across the length of the exhaust hood longitudinally and over the cooking surface. When the light beam is broken due to the density of emissions from the cooking surface, the sensors 24 relay a signal to a solenoid-operated valve 26 which valve releases cold water through an orifice 28 that aspirates a measured amount of oxidizer in the oxidizer/water scrubber 30 through a series of nozzles 32 located on a water manifold or manifolds 34 inside throat of the scrubber 30.

Many restaurant char-broiling systems are provided with scrubbers for washing the cooking vapors, in order to trap some of the water soluble constituents and larger solid particles by wetting them with a water spray and recovering the sprayed water with its trapped matter. The chemical oxidizer aspirating system and the smoke density opacity sensors provided in accordance with the present invention may conveniently be integrated with such a scrubber 30, as shown. The chemical oxidizer aspirating system may be provided separately for restuarant grills which do not have scrubbers.

The spray nozzles 32 are served by a water supply line connected to a source 36 of water and regulated pressure, e.g., a city water main. Flow through the water line 38 is controlled by a valve 26. The water line 36 is shown provided with an aspirator 28. A container 42 of concentrated chemical oxidizer 44 such as hydrogen peroxide or sodium hypochlorite solution is communicated with the aspirator 28 by a siphon tube 46 terminating in a venturi orifice, positioned so that the flow of water through the line 38 draws a proportionate amount of concentrated oxidizer through the line 46 and mixes it with the water in the aspirator 28. Accordingly, the spray emanating from the nozzles 32 consists of a water solution containing the chemical oxidizer.

A valve 48 may be installed in a line 50 connected in the line 36 upstream and downstream of the valve 26 to by-pass solenoid valve 26 and may be used for a continuous operation to coincide with increases and decreases in the flow of business and may be automatically operated, for instance, in response to an odor sensing device when an oxidation system is first installed and the oxidizer and its concentration are selected. An operating chart may be constructed empirically by use of an odor sensing device, or the human sense of smell, to relate various positions of by-pass valve 48 with various levels of business, for the level of odor reduction desired.

Above the oxidizer/water scrubber assembly 30, emissions are conducted to and through a commercially available backward blade centrifugal fan 52 and then discharged to the atmosphere through an ambient air mixer 54 consisting of an inner shell 56 and outer shell 58 the relative cross sectional areas of which are proportionately sized in an order of an approximate 2 to 3 ratio or such that the outside shell 58 cross sectional area is approximately 1½ times that of the inner shell 56. The emissions discharged to the atmosphere from the inner shell 56, have already been determined to average below the stringent requirements of the State of Maryland Air Quality Bureau in terms of grain loading. Specifically, Table 1 shows the average of three particular runs to be 0.027 GR/DSCF. The discharge velocity of these emissions creates a negative pressure in the annulus enclosed by the outer shell, and resulting in the introduction of ambient air mixture being discharged through the upper most part of the outer shell conductor.

The result of the ambient air mixer 54, combined with the oxidizer/water scrubber 30, and the hotter briquette surfaces is shown in terms of abatement of the visible emissions in FIGS. 2 and 3 which graphically reflect opacity as an index of visible emissions versus time span of an identical operation. The graph in FIG. 2 reflects a composite of opacity readings taken during 1 hour of particulate sampling of uncontrolled emissions during the tests reported in Example I. The graph of FIG. 2 reflects opacity readings taken by a certified smoke reader of emissions during the testing and evaluation of the system during the tests reported in Example II.

The invention is further understood with reference to the following examples.

EXAMPLE I

On Feb. 28 and March 1, 1974, the two 120,000 BTU/hr. gas-fired grills of Hardee's No. 2 Store in Jacksonville, N.C., were completely covered with hamburgers and operated in a "saturated" condition, i.e., completely covered with hamburgers, without the emission controls of the present invention, and sampling was conducted to determine what the emissions consisted of. The test methods used are those specified in the *Federal Register* of Dec. 23, 1971, Vol. 36, No. 247. The samples obtained were worked-up in accordance with the procedures set forth in the *Federal Register* of Aug. 17, 1971, Vol. 36, No. 159.

The grill's exhaust gas stack was sampled and analyzed as follows:

1. Particulate emissions — Three one-hour test runs
2. Particle Size — 3 Determinations
3. Oxides of Nitrogen — 8 Determinations
4. Total Aldehydes — 8 Determinations
5. Total Hydrocarbons — 19 Determinations
6. Sulfur Dioxide — 3 Determinations
7. Orsat, $CO_2/O_2/CO$ — 3 Determinations Tables I through V summarize the results of the emission testing program.

In the various tables, some of the emission rates are expressed as being less than a stated value. This arises from the fact that the particular compound being analyzed in the laboratory gave no response during analysis. Rather than report the component as "not detected", and definitely without proof of being able to say the emission is absolutely "0", the minimum amount of each compound that would be possible to detect was calculated. Thus, since the compound was not "seen" during the chemical analysis, the emission rate had to be less than the value as shown.

TABLE I
PARTICULATE EMISSION TEST SUMMARY

| Sampling Parameters | Run Number | | |
|---|---|---|---|
| | HFS-1 | HFS-2 | HFS-3 |
| Total Sampling Time, min. | 60 | 60 | 60 |
| Volume of Gas Sampled, dscf | 33.34 | 30.31 | 31.66 |
| Isokinetic Sampling % | 97 | 90 | 94 |
| Stack Gas Parameters | | | |
| Average Temperature, ° F. | 117 | 120 | 109 |
| Average Velocity at Stack Cond., fps | 30.9 | 30.6 | 30.1 |
| Average Flow Rate at Stack Cond., cfm | 3010 | 2980 | 2940 |
| Average Flow Rate at Std. Cond.* dscfm | 2730 | 2680 | 2690 |
| Moisture Content, Vol. % | 1.1 | 1.3 | 1.0 |
| $CO_2$ Content, Vol. % (Dry) | 0.3 | 0.3 | 0.3 |
| $O_2$ Content, Vol. % (Dry) | 20.3 | 20.4 | 20.4 |
| CO Content, Vol. % (Dry) | 0.0 | 0.0 | 0.0 |
| Avg. Plume Opacity, % (Approx.) | 15 | 15 | 15 |
| Particulate Emissions | | | |
| Dry Catch at Std. Cond.*, gr/dscf | 0.017 | 0.014 | 0.026 |
| Wet Catch at Std. Cond.*, gr/dscf | 0.027 | 0.021 | 0.033 |
| Dry Catch Emission Rate, lb/hr. | 0.398 | 0.309 | 0.609 |
| Wet Catch Emission Rate, lb/hr. | 0.641 | 0.486 | 0.757 |

*Standard conditions defined as 70° F. and 29.92 in. Hg.

TABLE II
OXIDES OF NITROGEN, REPORTED AS $NO_2$

| Sample No. | Time (Hours) | Concentration (ppm, by Vol.) | Mass Emission Rate, lbs/hr. |
|---|---|---|---|
| 1 | 11:20 | 5.3 | 0.10 |
| 2 | 11:50 | 4.0 | 0.08 |
| 3 | 12:40 | 3.7 | 0.07 |
| 4 | 13:10 | 4.8 | 0.09 |
| 5 | 15:21 | 6.0 | 0.11 |
| 6 | 16:50 | 4.8 | 0.09 |
| 7 | 17:15 | 7.7 | 0.15 |
| 8 | 17:55 | 5.7 | 0.11 |

TABLE III
TOTAL ALDEHYDES, REPORTED AS $CH_2O$

| Sample No. | Time (Hours) | Concentration (ppm, by Vol.) | Mass Emission Rate, lbs/hr. |
|---|---|---|---|
| 1 | 11:35 | 64.2 | 0.81 |
| 2 | 12:30 | 105 | 1.31 |
| 3 | 12:55 | 107 | 1.34 |
| 4 | 13:20 | 109 | 1.37 |
| 5 | 15:50 | 113 | 1.42 |
| 6 | 17:00 | 150 | 1.88 |
| 7 | 17:25 | 154 | 1.94 |
| 8 | 18:03 | 146 | 1.84 |

TABLE IV
TOTAL HYDROCARBONS, REPORTED AS $CH_4$

| Run No. | Time (Hours) | Concentration (ppm, by Vol.) | Mass Emission Rate, lbs/hr. |
|---|---|---|---|
| 1 | 09:20 | 9 | 0.060 |
| 2 | 09:25 | 11 | 0.074 |
| 3 | 09:35 | 10 | 0.067 |
| 4 | 09:50 | 14.5 | 0.097 |
| 5 | 09:52 | 20 | 0.134 |
| 6 | 09:53 | 35 | 0.234 |
| 7 | 09:56 | 18.5 | 0.124 |
| 8 | 09:58 | 14 | 0.094 |
| 9 | 10:45 | 17.5 | 0.117 |
| 10 | 10:55 | 28 | 0.187 |
| 11 | 11:05 | 22 | 0.147 |
| 12 | 11:30 | 35 | 0.234 |
| 13 | 11:35 | 21.5 | 0.144 |
| 14 | 11:45 | 26 | 0.174 |
| 15 | 11:47 | 13 | 0.087 |
| 16 | 12:47 | 32 | 0.214 |
| 17* | 12:48 | 43 | 0.288 |
| 18 | 12:52 | 26.5 | 0.177 |
| 19 | 12:53 | 27.5 | 0.184 |

*Run No. 17 was conducted at off-design conditions and thus, is not representative of normal operating procedure.

TABLE V
SULFUR DIOXIDE

| Run No. | Time (Hours) | Concentration (ppm, by Vol.) | Mass Emission Rate, lbs/hr. |
|---|---|---|---|
| HFS-1 | 16:50–17:00 | < 0.9 | < 0.024 |
| HFS-2 | 17:15–17:25 | < 0.6 | < 0.016 |
| HFS-3 | 17:38–17:48 | < 0.9 | < 0.024 |

Note:
Sulfur Trioxide analysis was performed on the samples collected during the above $SO_2$ tests. This analysis involves a titration of the contents of the first bubbler with barium perchlorate. In all cases, the $SO_3$ concentration was non-detectable.

Sampling was conducted in a rectangular section of duct-work, downstream from the induced draft fan. In order to facilitate sampling, it was necessary to add an extension, 12 feet in length, to the existing duct-work.

TABLE VI
PARTICLE SIZE ANALYSIS

Sample I

| Reticle Circle No. | Circle Diameter* | Number of Particles | Cumulative Total | Cumulative Percent |
|---|---|---|---|---|
| 1 | .54 | 246 | 246 | 81.4 |
| 2 | .76 | 21 | 261 | 88.4 |
| 3 | 1.08 | 15 | 282 | 93.3 |
| 4 | 1.52 | 12 | 294 | 97.3 |
| 5 | 2.16 | 6 | 300 | 99.3 |
| 6 | 3.10 | 0 | 300 | 99.3 |
| 7 | 4.32 | 0 | 300 | 99.3 |
| 8 | 6.20 | 1 | 301 | 99.6 |
| 9 | 8.64 | 0 | 301 | 99.6 |
| 10 | 12.40 | 0 | 301 | 99.6 |
| 11 | 17.28 | 1 | 302 | 100.0 |

SAMPLE II

| Reticle Circle No. | Circle Diameter* | Number of Particles | Cumulative Total | Cumulative Percent |
|---|---|---|---|---|
| 1 | .54 | 251 | 251 | 81.4 |
| 2 | .76 | 23 | 274 | 88.9 |
| 3 | 1.08 | 12 | 286 | 92.8 |
| 4 | 1.52 | 13 | 299 | 97.0 |
| 5 | 2.16 | 7 | 306 | 99.0 |
| 6 | 3.04 | 2 | 308 | 100.0 |

*Measured in microns.

TABLE VI
PARTICLE SIZE ANALYSIS

Sample III

| Reticle Circle No. | Circle Diameter* | Number of Particles | Cumulative Total | Cumulative Percent |
|---|---|---|---|---|
| 1 | .54 | 253 | 253 | 84.3 |
| 2 | .76 | 24 | 277 | 92.3 |
| 3 | 1.08 | 10 | 287 | 95.6 |
| 4 | 1.52 | 9 | 296 | 98.6 |
| 5 | 2.16 | 4 | 300 | 100.0 |

*Measured in microns.

EXAMPLE II

ON Nov. 7, 1974, the two 120,000 BTU/hr. gas-fired grills of the Hardee's store located on Coalter St. in Staunton, Va., was operated in a saturated condition, with the emission controls of the present invention operating.

The stack was sampled and analyzed as follows:
1. Particulate Emissions: — one 44-point run
2. Total Aldehydes: — 8 determination
3. Visible Emissions: — 120 readings The field sampling process was conducted in two parts. The fast-food industry is characterized by two rush periods of business during each working day. Of course, these are the lunch-time and dinner-time peaks. Other than these two periods, the cooking facilities generally are not operated at capacity. In order to examine a worst case situation, the one particulate test and the first four aldehyde samples were collected during the peak, lunch-time business. The manager of the local store assisted in the testing program by insuring that the grills were "saturated" with hamburger patties during this 2.5 hour period.

The second phase of the test program was conducted later in the afternoon of the same day. While these tests could not be conducted during the busy dinner-time hour, a worst case situation was again simulated by artificially loading the grills to saturation with hamburger patties. At this time, the last four aldehyde samples were collected and visible emissions were recorded for 30 minutes.

TABLE VII
PARTICULATE EMISSION TESTS SUMMARY

| Sampling and Operating Parameters | Test Number HFS-4 |
|---|---|
| Total Sampling Time, min. | 132.0 |
| Volume of Gas Sampled, dscf | 79.1 |
| Isokinetic Sampling % | 95.5 |
| Stack Gas Parameters | |
| Average Temperature, ° F. | 73 |
| Average Velocity, fps at Std. Cond.* | 13.6 |
| Average Flow Rate, dcfm at Std. Cond.* | 3940 |
| Moisture Content, Vol. % | 1.5 |
| $CO_2$ Content, Vol. % | 0.4 |
| $O_2$ Content, Vol. % | 20.9 |
| CO Content, Vol. % | 0.0 |
| Average Plume Opacity, % (Approx.) | < 10.0 |
| Dry Particulate Emissions | |
| gr/cf at Stack Conditions | 0.015 |
| gr/dscf | 0.016 |
| lbs/hr. | 0.551 |
| Total Particulate Emissions | |
| gr/cf at Stack Conditions | 0.020 |
| gr/dscf | 0.022 |
| lbs/hr. | 0.726 |

*Note
Standard Conditions Defined as 70° F. and 29.92 in. Hg.

TABLE VIII
TOTAL ALDEHYDES, REPORTED AS $CH_2O$

| Sample No. | Time (Hours) | Concentration (ppm, by Vol.) | Mass Emission Rate, lbs/hr. |
|---|---|---|---|
| 1 | 11:48 | 27.9 | 0.52 |
| 2 | 12:15 | 36.8 | 0.68 |
| 3 | 12:30 | 57.6 | 1.07 |
| 4 | 12:45 | 27.4 | 0.51 |
| 5 | 15:25 | 28.6 | 0.53 |
| 6 | 15:40 | 37.9 | 0.70 |
| 7 | 15:50 | 35.0 | 0.65 |
| 8 | 15:55 | 26.6 | 0.49 |
| Average Values | | 34.7 | 0.64 |

The results of the visible emission evaluation can be summarized as follows:
1. No (0) readings were recorded in excess of 20%.
2. Of the 120 readings, only one was 20%.
3. Of the 120 readings, 102 were 10% or less.

The field sampling crew for the tests of Example II reported that there was no noticeable odor communicating from the stack during the tests.

By comparing Tables III and VIII, it is noted that use of the invention resulted in a 70.7% reduction in P.P.M. of aldehyde emissions and an average 56.7% reduction thereof on a pounds per hour basis. It is also evident from Tables I – V that aldehyde emissions are relatively preponderant among the emissions which use of the invention seeks to control and reduce.

Above the oxidizer/water scrubber assembly 30, emissions are conducted to and through a commercially available backward blade centrifugal fan 52 and then discharged to the atmosphere through an ambient air mixer 54, consisting of an inner shell 56 and outer shell 58, the relative cross-sectional areas of which are proportionately sized in an order of an approximate 2 to 3 ratio or such that the outside shell 58 cross-sectional area is approximately 1½ times that of the inner shell 56. The emissions discharged to the atmosphere from the inner shell 56, have already been determined to average below the stringent requirements of the State of Maryland Air Quality Bureau in terms of grain loading. Specifically, Table I shows the average of three particular runs to be 0.027 GR/DSCF. The discharge velocity of these emissions creates a negative pressure in the annulus enclosed by the outer shell, and resulting in the introduction of ambient air mixture being discharged through the uppermost part of the outer shell conductor.

The result of the ambient air mixer assembly 54, combined with the oxidizer/water scrubber 30, and the hotter briquette surfaces is shown in terms of abatement of the visible emissions in FIGS. 2 and 3, which graphically reflect opacity as an index of visible emissions versus time span of an identical operation. The graph of FIG. 2 reflects a composite of opacity readings taken during 1 hour of particulate sampling of uncontrolled emissions during the tests reported in Example I. The graph of FIG. 2 reflects opacity readings taken by a certified smoke reader of emissions during the testing and evaluation of the system during the tests reported in Example II.

Although it is preferred that the odor and smoke abatement techniques described herein be used in conjunction with one another, clearly, some improvement is derived from the use of each by itself or in conjunction with yet other abatement techniques.

It should now be apparent that the restaurant meat broiling system with reduced smoke and odor emissions as described hereinabove possesses each of the attributes set forth in the specification under the heading of "Summary of the Invention" hereinbefore. Because the restaurant meat broiling system with reduced smoke and odor emissions can be modified to some extent without departing from the principles of the invention as they have been outlined and explained in this specification, the present invention should be understood as encompassing all such modifications as are within the spirit and scope of the following claims.

What is claimed is:

1. In a restaurant meat broiling method for a restaurant having a property line bounding the restaurant, in which method meat slabs are to be supported on a grill and cooked from below by heat radiating from a layer of heat radiating bodies which, in turn, are heated from beneath, typically by a gas burner, and
   wherein the rising cooking vapor exhaust stream is collected in a hood which connects with a stack for discharging the cooking vapor exhaust stream to the atmosphere,
   a method for abating odor and smoke emissions in the cooking vapor exhaust stream, comprising:
   running the grill with the heat radiating bodies at a temperature, at the surfaces thereof which are presented toward the meat patties, between 600° F. and 800° F., in order to more completely incinerate meat juices which drop from the meat slabs onto the heat radiating bodies; and
   spraying into the cooking vapor exhaust stream, after the said stream is collected in the hood but before said stream is discharged to the atmosphere sufficient quanta of oxidizer for the ordorous aldehydes released by char-broiling meat, to render the discharged stream substantially odorless as sensed at the boundary of the restaurant property,
   wherein sufficiency of quanta is determined by initially running the grill at various degrees of saturation expected during meat broiling at the restaurant,
   for each of several degrees of increasing saturation, adding to the rate of said spraying until, from the boundary of the restaurant property, the discharged stream is sensed as being substantially odorless,
   sensing the degree of opacity of the cooking vapor exhaust stream as it enters the hood,
   tabulating the spraying rate for achieving substantially odorless discharge at said boundary versus the degree of saturation of the grill for each of said several degrees and ranking the degree of opacity with the corresponding degrees of increasing saturation of the grill, and
   utilizing the tabulation during operation of the grill to select the rate of spraying of oxidizer corresponding to the particular degree of saturation being experienced on the grill and the degree of opacity being experienced as the cooking vapor exhaust stream enters the hood.

2. The method of claim 1, wherein:
   the oxidizer is hydrogen peroxide.

3. The method of claim 1, wherein
   the hydrogen peroxide is aspirated into the water supply line of a scrubber provided in the hood, so that the oxidizer is sprayed with the water by the scrubber in the hood.

4. The method of claim 1, wherein:
   the selected rate of spraying is manually put into effect.

5. The method of claim 1, wherein:
   the selected rate of spraying is automatically put into effect by operatively coupling the steps of sensing the degree of opacity with the step of spraying.

6. The method of claim 1, further comprising the steps of:
   inducting ambient air into the cooking vapor exhaust stream downstream of the spraying step and upstream of the discharging of the steam into the atmosphere; and
   mixing the inducted ambient air with the cooking vapor exhaust stream to reduce the opacity of the cooking vapor exhaust stream as discharged.

7. The method of claim 1, wherein
   the heat radiating bodies are no thicker than about ½ inch thick.

* * * * *